Figure 1:
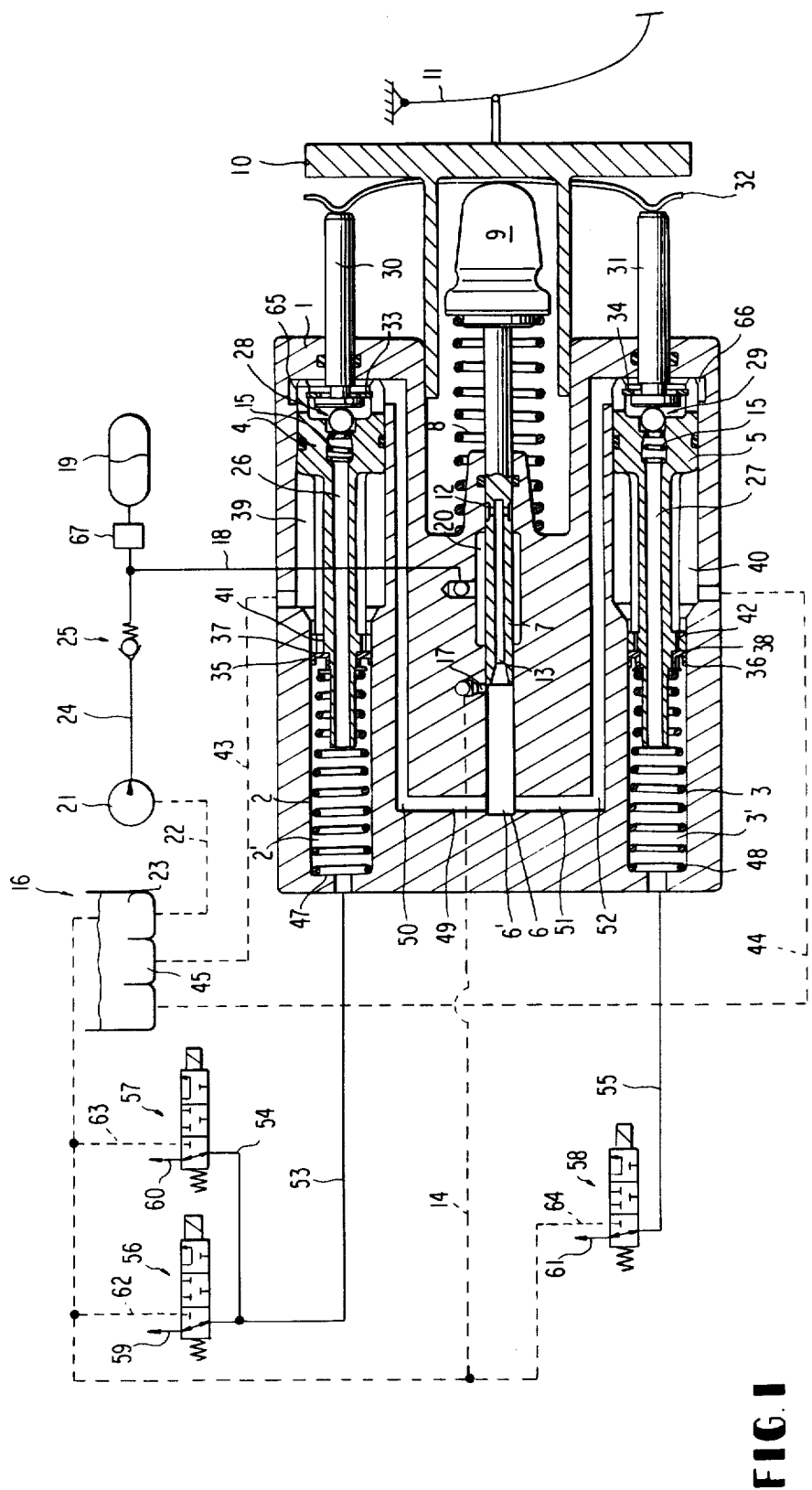

United States Patent [19]

Resch et al.

[11] 4,405,181

[45] Sep. 20, 1983

[54] BRAKE VALVE

[75] Inventors: Reinhard Resch, Stuttgart; Hellmut Krohn, Esslingen, both of Fed. Rep. of Germany

[73] Assignee: Daimler-Benz Aktiengesellschaft, Stuttgart, Fed. Rep. of Germany

[21] Appl. No.: 257,386

[22] Filed: Apr. 24, 1981

[30] Foreign Application Priority Data

Apr. 24, 1980 [DE] Fed. Rep. of Germany ....... 3015729

[51] Int. Cl.³ .............................................. B60T 13/14
[52] U.S. Cl. ........................................ 303/9; 303/52; 303/92
[58] Field of Search ............. 303/9, 10, 50, 52, 54, 303/92, 113, 116

[56] References Cited

U.S. PATENT DOCUMENTS 3,881,781 5/1975 Skoyles .................................. 303/92
3,927,915 12/1975 Adachi .............................. 303/52 X

FOREIGN PATENT DOCUMENTS 2753585 6/1979 Fed. Rep. of Germany .......... 303/9

Primary Examiner—Duane A. Reger
Attorney, Agent, or Firm—Craig & Burns

[57] ABSTRACT

A brake valve useable in conjunction with a vehicle braking system is monitored by an anti-locking device and operable by a brake pedal through a trailing or simulating spring. The brake valve is provided with a control slide valve for regulating a metered feed of the pressure medium conducted from a pressure source to the wheel brake cylinders of the braking system. The pressure medium is furthermore relievable at the wheel brake cylinders by anti-lock valves. The control slide valve cooperates with at least two emergency pistons freely traversible during normal operation of the braking system. Each of these emergency pistons are mechanically operable from the brake pedal in case of failure of the energy supply or of a brake circuit after a valve associated with the respective pistons has been closed.

9 Claims, 2 Drawing Figures

BRAKE VALVE

The present invention relates to a brake valve and, more particularly, to a brake valve adapted to be used in conjunction with a vehicle braking system monitored by an anti-locking device and operable by a brake pedal through a trailing or so called simulating spring, with the brake valve being provided with a control slide valve for regulating a metered feed of the pressure medium conducted from a pressure medium source to wheel brake cylinders, and with the pressure medium being relievable at the wheel brake cylinders by anti-lock valves.

In German Offenlegungsschrift No. 2,702,819, a brake power booster construction is proposed which operates with a brake valve and two main pistons, with the main piston separating the two brake circuits from a common storage circuit. A complete separation of segregation between the brake circuits and the storage circuit is disadvantageous for an anti-lock circuit because an anti-lock pressure modulation can only take place through the common storage circuit. Thus, under a pressure reduction at one wheel brake cylinder, a simultaneous pressure increase at the other wheel brake cylinders is impossible.

In proposed brake boosters with closed brake circuits, the main pistons must be returned into a starting position during maximum braking pressure application from the brake pedal during, for example, panic braking and icy roadways. Due to an increase in available space, the brake pressure then declines. This type of pressure modulation is more inert in response behavior due to the large piston masses to be moved as compared with systems having open brake circuits and directly bleedable or relievable valves.

The object underlying the present invention essentially resides in providing a brake valve arrangement useable in braking systems monitored by an anti-locking device which is constructed in such a manner that, upon a failure of a pressure medium source, an emergency activation device automatically becomes effective.

In accordance with advantageous features of the present invention, a control slide valve is provided which cooperates with at least two emergency pistons each of which are adapted to afford a free throughflow during normal operation of a brake system, with each of the emergency pistons being operable mechanically from the brake pedal upon a failure of the energy supply, i.e., pressure medium source, or upon a failure of a brake circuit.

According to the present invention, each emergency piston includes a central longitudinal bore which is adapted to be traversed by a pressure medium during a normal operation of the brake system, with the central longitudinal bore being closed in case of an emergency actuation by the force of a tappet connected through a yoke to the brake pedal. The tappet is adapted to urge a spring loaded ball against a valve seat so as to close an opening of the central longitudinal bore of the emergency pistons.

Advantageously, each emergency piston is constructed as a stepped piston with a large piston surface and a smaller piston surface. During an emergency operation, the smaller piston surface is adapted to convey or supply an operating pressure medium to the wheel brake cylinders. A spring, supported on one hand in a housing of the brake valve is adapted to press against the smaller piston surface. By virtue of the provision of conduits or pressure medium lines emanating from pressure chambers associated with the emergency pistons, the pressure chambers may be connected to the anti-lock valves by way of which the associated wheel brake cylinders may be relieved of pressure.

Advantageously, the two emergency pistons may be arranged in a housing of the brake valve to the left and right of a control slide valve and extend in parallel to the control slide valve. However, it is also possible to arrange one emergency piston so as to extend coaxially to the control slide valve with the other piston being disposed in parallel and at a spacing with respect to the control slide valve.

Preferably, the large piston surface of each emergency piston is exposed to the pressure of the pressure medium in a pressure medium reservoir and a spring which presses against the smaller piston surface is constructed as a helical compression spring. It is also possible for the two emergency pistons to be provided with equal sized piston surfaces with one being exposed to pressure medium from a pressure medium reservoir and the other for transmitting pressure to the pressure medium in the brake circuits.

Advantageously, the anti-lock devices formed as anti-lock valves are connected by way of appropriate conduits or pressure medium lines to the pressure chambers of the emergency pistons. A storage pressure and the pressure medium reservoirs may be monitored by a storage pressure sensor with a control signal from the storage pressure sensor being concomitantly employed for an activation or de-activation of the anti-locking device.

Accordingly, it is an object of the present invention to provide a brake valve useable in conjunction with a vehicle braking system monitored by an anti-locking device which avoids, by simple means, shortcomings and disadvantages encountered in the prior art.

Another object of the present invention resides in providing a brake valve useable in conjunction with a vehicle braking system monitored by an anti-locking device which provides for an automatic activation of an emergency device upon a failure of a pressure medium source of the brake system.

Another object of the present invention resides in providing a brake valve useable in conjunction with a vehicle braking system monitored by an anti-locking device which functions reliably under all operating conditions of the brake system.

A still further object of the present invention resides in providing a brake valve which is simple in construction and therefore relatively inexpensive to manufacture.

Yet another object of the present invention resides in providing a brake valve which has a relatively small axial length and relatively small width.

Figure 2:
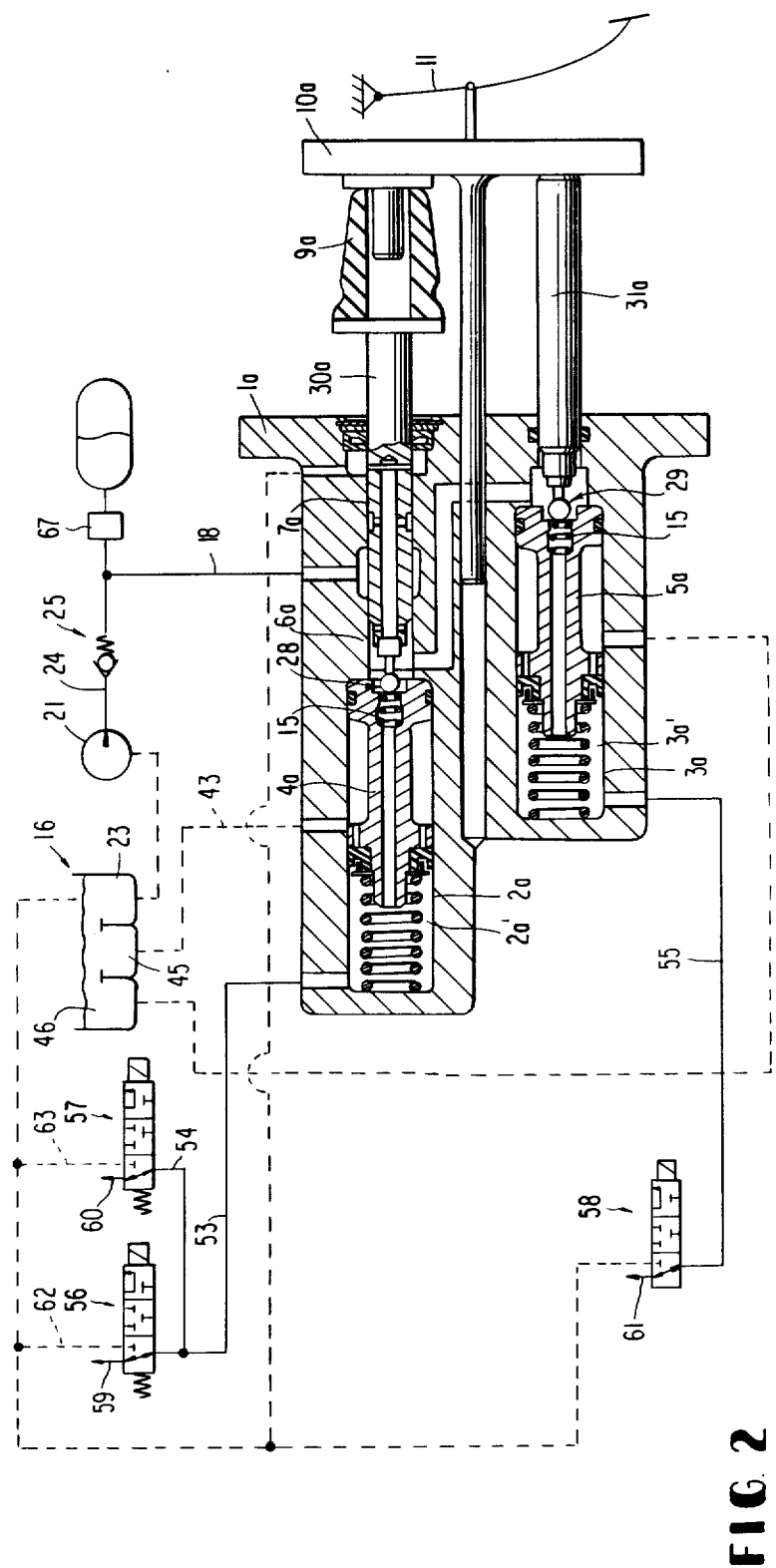

These and other objects, features, and advantages of the present invention will become more apparent from the following description when taken in connection with the accompanying drawings which show, for the purposes of illustration only, two embodiments in accordance with the present invention, and wherein:

FIG. 1 is a partially schematic longitudinal cross sectional view of a brake valve constructed in accordance with the present invention and provided with two emergency pistons located to a right and to a left of a control slide valve; and FIG. 2 is a partially schematic longitudinal cross sectional view of a further embodiment of a brake valve constructed in accordance with the present invention and provided with one emergency piston arranged coaxial to a control slide valve and a second emergency piston being arranged adjacent the control slide valve.

Referring now to the drawings wherein like reference numerals are used throughout both views to designate like parts and, more particularly, to FIG. 1, according to this Figure, a brake valve includes a housing 1 in which is arranged two staggered or stepped bores 2/39 and 3/40, with the bores 2, 3 having the smaller diameter and respectively constituting a pressure chamber to be described more fully hereinbelow, with the bores 39 and 40, having a larger diameter, constituting or forming auxiliary intake chambers. Stepped pistons 4, 5 are adapted to the bores 2/39 and 3/40, with the stepped pistons 4, 5 serving as emergency pistons within the context of the present invention.

The housing 1 is provided with a further bore 6 in which is arranged a slide valve 7. The slide valve 7 is urged by a helical compression spring 8 and an interposed trailing or simulating spring 9 against a yoke 10 which is adapted to follow movements of a brake pedal 11.

The slide valve 7 is provided with a peripheral or annular groove 12 and a centrally disposed longitudinal bore 13. With the slide valve 7 being disposed in a starting position illustrated in FIG. 1, the slide valve 7 maintains a reflux bore 17 open. The reflux bore 17 is in communication through a conduit 14 with a pressure medium storage tank generally designated by the reference numeral 16. With the slide valve 7 in the same position, i.e., the starting position, slide valve 7 seals off an annular chamber 20 which is in communication through a conduit 18 with a pressure medium reservoir or accumulator 19. The pressure medium reservoir 19 is filled by a pump 21 through a pressure line 24 in which is arranged a check valve generally designated by the reference numeral 25. The pump 21 is connected through an intake line 22 to a chamber 23 of the storage tank 16.

Each of the emergency pistons 4, 5 is respectively provided with central longitudinal bores 26, 27, at the ends of which ball valves generally designated by the reference numerals 28 and 29 are disposed, with the ball valves being operated or urged into an open position by means of springs 15. The ball valves 28, 29 cooperate with tappets 30, 31 which are adapted to be displaced in a longitudinal direction by a yoke 10 through a rocker arm 32 in response to a movement of the brake pedal 11. The tappets 30, 31 are firmly linked to the emergency pistons 4, 5 through spring rings 33, 34.

The emergency pistons 4, 5 are respectively provided on a tapered end thereof facing away from the valves 28, 29 with primary collars 35, 36. The rear sides of the collars 35, 36 are respectively in contact with discs 37, 38 and are otherwise in sealing pressure contact with inner wall surfaces of the pressure chambers 2, 3. The discs 37, 38 simultaneously seal off bores 41, 42 respectively leading to the auxiliary intake chambers 39, 40. Conduits 43, 44 are provided for respectively communicating the intake chambers 39 and 40 with chambers 45, 46 of the storage tank 16. The emergency pistons 4, 5 are urged into their starting position illustrated in FIG. 1 by means of helical compression springs 47, 48 disposed in the pressure chambers defined by the cores 2, 3.

The bore 6 in the housing 1 defines a pressure chamber 6' wherein the control slide valve 7 may be longitudinally displaceable to and fro. The pressure chamber 6' is connected through bores 49, 50, 51 and 52 to pressure chambers 65 and 66 disposed on a brake pedal side of the emergency pistons 4, 5.

Pressure chambers 2', 3' formed by the bores 2, 3 are respectively in communication by way of conduits 53, 54, and 55 with anti-lock valves generally designated by the reference numerals 56, 57, and 58. Conduits 59, 60 and 61 extend from the anti-lock valves, with the conduits 59, 60 and 61 leading to the wheel brake cylinder (not shown) of the brake system. Reflux lines 62, 63 and 64 extend from the individual anti-lock valves 56, 57, and 58 and are connected to the reflux line or conduit 14 which is in communication with the pressure chamber 6' of the pressure bore 6 through the reflux bore 17.

The mode of operation of the brake valve will be described more fully hereinbelow in two conditions, namely, first with a braking with the brake system intact and, secondly, braking when a brake energy supply has failed, i.e., with the pressure reservoir 19 being empty.

With the braking system being intact, braking is performed by the procedure that, upon an actuation of the brake pedal 11, the yoke 10 displaces the control slide valve 7 through the trailing spring 9 toward the left of FIG. 1 and thereby the reflux bore 17 is first of all closed. If now the brake pedal 11 is further pivoted or displaced, the annular groove 12 enters into congruence with the annular chamber 20 which is under reservoir pressure so that thereby pressure medium passes from the pressure reservoir through the longitudinal bore 13 into the pressure chamber 6'. From the pressure chamber 6', the pressure medium flows through the bores 49, 50 and 51, 52 through the valves 28 and 29 and the central longitudinal bores 26 and 27 into the pressure chambers 2', 3'. From the pressure chambers 2', 3', the pressure medium flows through the conduits 53, 54, and 55 to the anti-lock valves 56, 57 and 58. The pressure medium leaves the anti-lock valves 56, 57, 58 through the conduits 59, 60, 61, respectively, and acts on the respective wheel brake cylinders in a conventional manner. The anti-lock valves 56 and 57 are associated with one brake circuit of the brake system and the anti-lock valve 58 is associated with another brake circuit of the brake system.

The system pressure in the brake valve is transmitted by the control slide valve 7 and the trailing spring 9 to the brake pedal 11 so that a back indication or reactive pressure to the user occurs. At the same time, the system pressure also acts on the emergency pistons 4, 5 which, due to differing pressure surfaces, are shifted hydraulically so that, depending upon a dimensioning of the stepped configuration of the respective emergency pistons 4, 5, the tappets 30 and 31 exert no reactive force or only a minor reactive force on the rocker arm 32 and the valves 28 and 29 remain opened. It is thereby possible for additional pressure medium to be flowing into one of the wheel brake cylinders in case of a danger of locking after a pressure drop. This means that the pressure is raised in those wheel brake cylinders which are not presently subject to control by one of the anti-lock valves 56, 57, 58.

If now the brake energy supply fails or the pressure reservoir 19 has been emptied due to, for example, a leakage in a brake circuit, braking may still be effected in the following manner. During operation of the brake pedal in this situation, the tappets 30 and 31 and now shifted through the rocker arm 32 toward the left of FIG. 1 and thereby the valves 28 and 29 are closed and the emergency pistons 4, 5 urge the pressure medium enclosed in the chambers 2' and 3' to the brake cylinders of the wheels. The rocker arm 32 serves for the purpose of ensuring, in case of an emergency operation, a pressure equality or uniformity between the two brake circuits. During a return movement of the emergency pistons 4, 5, brake fluid may additionally be taken in through the bores 41 and 42 if required from chambers 39 and 40 into the pressure chambers 2' and 3'. In the operating moment with a failure of an outside energy supply, the anti-locking system may be de-activated in a suitable manner by an appropriate switch (not shown) whereby the emergency activation device described hereinabove remains effective. It is also possible to de-activate the anti-locking device upon the occurrence of a predetermined lower cut-off pressure. For this purpose, a storage pressure sensor 67 may be provided for monitoring the storage pressure of the pressure medium in the pressure medium reservoir 19, with the storage pressure sensor being adapted to provide a control signal which may be employed for activation or de-activation of the anti-locking device.

FIG. 2 provides an example of another embodiment of a brake valve constructed in accordance with the present invention and, according to this figure, a housing 1a is provided with a staggered bore 2a/6a and a further bore 3a with the bores 2a, 3a respectively accommodating emergency pistons 4a, 5a and the bore 6a accommodating a slide valve 7a. As shown in FIG. 2, the emergency piston 4a is arranged coaxially to the control slide valve 7a; however, the emergency piston 4a is otherwise operated exactly as in the preceding embodiment through a trailing or simulating spring 9a from the brake pedal 11 by way of a yoke 10a. As with the embodiment of FIG. 1, valves 28, 29 control the throughflow of pressure medium through the longitudinal center bores of the pistons 4a, 5a and, when the valves 28, 29 are closed, the emergency pistons 4a, 5a urge the pressure medium enclosed in chambers 2a', 3a' to the wheel brakes. In all other respects the brake valve of FIG. 2 operates in the manner corresponding to the manner of operation described hereinabove in connection with FIG. 1; therefore, it is unnecessary to describe the mode of operation of the brake valve shown in FIG. 2 in any greater detail. In any event, the brake valve of FIG. 2 may be activated in the same way when the external energy supply is intact and also in case of a failure of such external energy supply, the two emergency pistons 4a, 5a, commence operation in a corrresponding manner and supply the wheel brake cylinders with the pressure medium.

To prevent a re-active pressure on the brake pedal from becoming excessively high for the sensing by the user of such pressure, it is necessary in the embodiment of FIG. 1 to fashion the two emergency pistons so as to be stepped since otherwise, from three sides, a reactive pressure which, in total, is too high would be exerted on the yoke 10 and thus on the brake pedal 11. However, with the embodiment illustrated in FIG. 2, the reaction pressure for sensing the reactive force stems only from two pistons and, consequently, the resultant reactive forces are just large enough for yielding a re-active pressure which is still bearable for a user to sense such pressure.

While we have shown and described only two embodiments in accordance with the present invention, it is understood that the same is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. A brake valve used in connection with an anti-locking means for a vehicle brake system and actuated by means of a brake pedal against a return force of a path-simulation spring, comprising a slide valve means for shifting by operation of the brake pedal and for controlling pressure admission of a wheel brake cylinder or a dosaging of a pressure medium led from a pressure source to the wheel brake cylinders, said cylinders also controlled by blocking valves, the slide valve means controlling a pressure medium supply to inlet pressure chambers of emergency pistons, outlet pressure chambers of which, by means of the blocking valves, are connected to the wheel brake cylinders, at least two emergency pistons being provided, of which each, in the case of a breakdown of the pressure medium supply, being operated mechanically by the brake pedal, each emergency piston having a central pressure-medium duct leading from the inlet pressure chamber to the outlet pressure chamber, by means of which, during normal braking, the pressure source is connected to the outlet pressure chambers of the emergency pistons and, by the blocking valves, connected at the outlet side of said emergency pistons, being connected to the wheel brake cylinders; and during breakdown of the pressure-medium supply, these pressure-medium ducts penetrating the emergency pistons being blocked by means of valves closable by brake pedal action and the emergency pistons being operated together whereby wheel brake cylinders of the vehicle brake system are individually controlled.

2. The brake valve according to claim 1, wherein each emergency piston has a central longitudinal bore, through which the pressure medium flows during normal operation, with said longitudinal bore, for breakdown of the pressure medium supply from a storage unit, being closed by force of a tappet means connected with the brake pedal by means of a yoke, with said tappet means then closing a ball valve loaded by a spring against its valve seat.

3. The brake valve according to claim 1, wherein the two emergency pistons are arranged in a brake valve housing extending on the right and on the left of the slide valve means; each emergency piston having a large piston surface area acted upon by a stored pressure medium and having a small piston surface area, by means of which the pressure medium is transported to the blocking valve and against which a spring means is arranged in the brake valve housing for normally urging the respective emergency pistons into a starting position.

4. The brake valve according to claim 1, wherein one emergency piston being arranged coaxially to the slide valve means, and the other emergency piston being arranged parallel and at a lateral distance to the slide valve means, and each of the two emergency pistons having two piston surfaces of equal size, on the one hand, for the admission of the pressure medium from a pressure source, and, on the other hand, for the transmission of the pressure to the anti-locking means.

5. The brake valve according to claim 3, wherein means are provided for communicating the pressure chamber means associated with the small piston area of the respective emergency piston means with the anti-lock valve means.

6. The brake valve according to claim 5, wherein means are provided for monitoring a storage pressure in the pressure medium source and for providing a control signal for activating and de-activating the anti-locking means.

7. The brake valve according to claim 4, wherein means are provided for monitoring a storage pressure in the pressure medium source and for providing a control signal for activating and de-activating the anti-locking means.

8. The brake valve according to claim 4, wherein means are provided for communicating the pressure chambers associated with the respective emergency piston means with the anti-locking means.

9. The brake valve according to claim 8, wherein means are provided for monitoring a storage pressure in the pressure medium source and for providing a control signal for activating and de-activating the anti-locking means.

* * * * *